US008595690B2

(12) United States Patent
Moore

(10) Patent No.: US 8,595,690 B2
(45) Date of Patent: Nov. 26, 2013

(54) CODE GENERATION

(75) Inventor: Devin C. Moore, Lewis Center, OH (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 829 days.

(21) Appl. No.: 12/768,079

(22) Filed: Apr. 27, 2010

(65) Prior Publication Data
US 2011/0265061 A1 Oct. 27, 2011

(51) Int. Cl.
G06F 9/44 (2006.01)
G06F 17/22 (2006.01)

(52) U.S. Cl.
USPC .......................................... 717/106; 715/234

(58) Field of Classification Search
USPC ......................................................... 717/106
See application file for complete search history.

(56) References Cited

U.S. PATENT DOCUMENTS

| 6,128,622 | A * | 10/2000 | Bach et al. | 717/114 |
|---|---|---|---|---|
| 6,263,352 | B1 * | 7/2001 | Cohen | 715/206 |
| 6,959,415 | B1 * | 10/2005 | Soderberg et al. | 715/234 |
| 7,110,936 | B2 * | 9/2006 | Hiew et al. | 703/22 |
| 7,386,833 | B2 * | 6/2008 | Granny et al. | 717/109 |
| 8,015,541 | B1 * | 9/2011 | Srinivasan et al. | 717/104 |
| 8,122,017 | B1 * | 2/2012 | Sung et al. | 707/723 |
| 2003/0221184 | A1 * | 11/2003 | Gunjal et al. | 717/118 |
| 2004/0088688 | A1 * | 5/2004 | Hejlsberg et al. | 717/143 |
| 2008/0288919 | A1 * | 11/2008 | Hodges et al. | 717/106 |
| 2008/0306883 | A1 * | 12/2008 | Baffier et al. | 705/400 |
| 2010/0192122 | A1 * | 7/2010 | Esfahan et al. | 717/105 |

OTHER PUBLICATIONS

Galen S. Swint, Calton Pu, Gueyoung Jung, Wenchang Yan, Younggyun Koh, Qinyi Wu, Charles Consel, Akhil Sahai, and Koichi Moriyama. 2005. Clearwater: extensible, flexible, modular code generation. In Proceedings of the 20th IEEE/ACM international Conference on Automated software engineering (ASE '05). ACM, New York, NY, USA, 144-153. DOI=10.1145/110.*

* cited by examiner

Primary Examiner — James D Rutten

(57) ABSTRACT

At least one business rule is received that specifies at least one template to be used in generating a code file. A configuration file is generated that identifies a location of the at least one template. The at least one template is retrieved and parsed to generate a question file that indicates at least one tag in the at least one template. User input is obtained concerning a value that relates to the at least one tag. The code file is generated by replacing the at least one tag in the template with the value.

19 Claims, 5 Drawing Sheets

CODE GENERATION

BACKGROUND INFORMATION

Many computer applications, such as websites, have frequently changing requirements and require new computer source code for operation. For example, some websites frequently require new web pages. Unfortunately, present mechanisms for creating application code, such as mechanisms for creating code to generate a web page, present limitations. For example, mechanisms for code creation may not incorporate business rules that describe features that the code must implement. Further, existing mechanisms may not facilitate code creation by users who are not conversant with source code, and may force even users who are conversant with source code to conduct a cumbersome exercise.

DETAILED DESCRIPTION OF PREFERRED EMBODIMENTS

Figure 1:
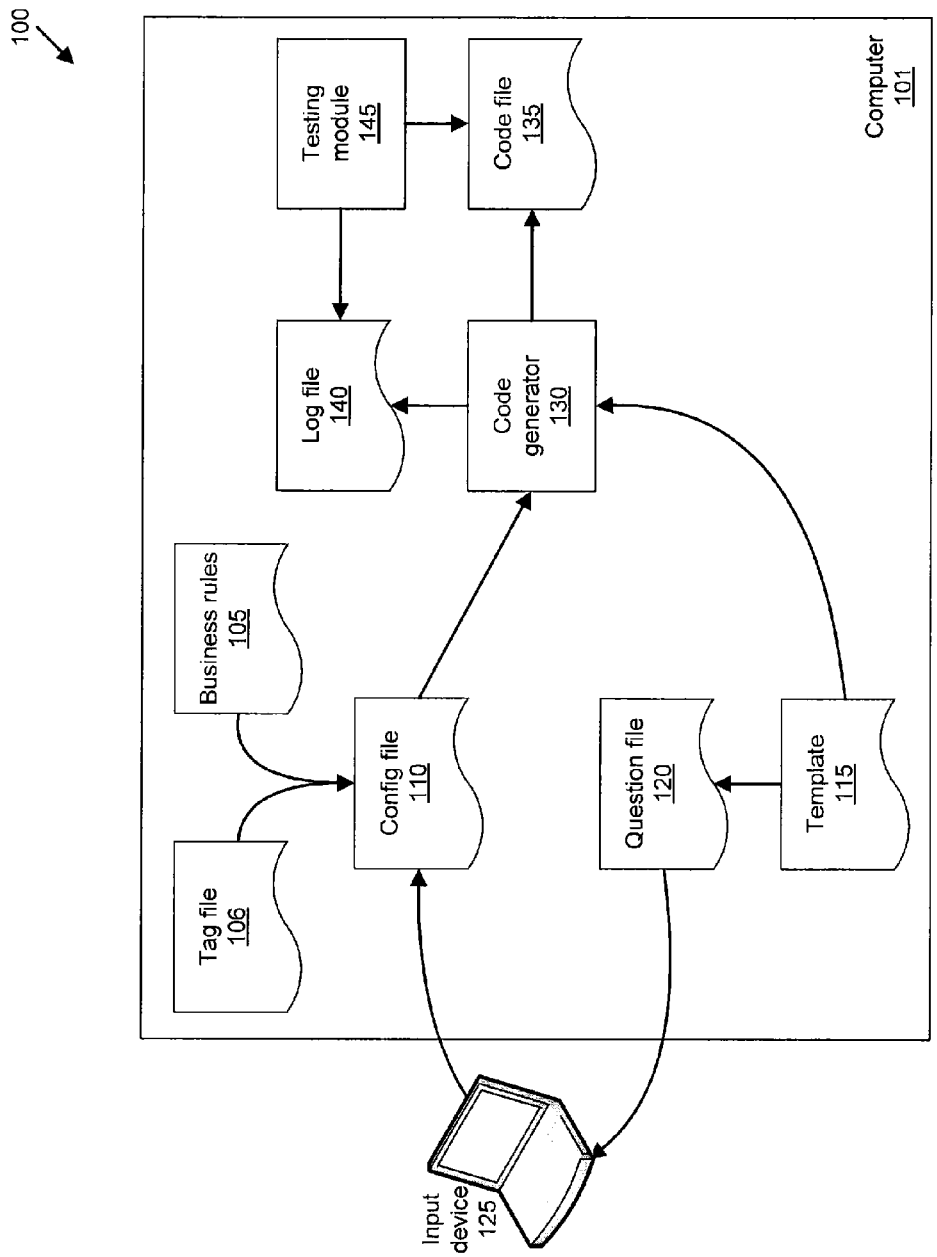
FIG. 1 illustrates an exemplary system for code generation and validation.

FIG. 1 illustrates an exemplary system 100 that includes a computer 101. A set of business rules 105 is included in or provided to the computer 101, e.g., stored in a file or the like in a tangible computer-readable medium, such as a memory of computer 101, a medium such as a disk in an associated storage device, etc. Business rules 105 include rules used by computer 101, e.g., according to computer-executable instructions stored therein, for building a configuration (config) file 110 that may be stored in computer 101 or computer-readable medium associated therewith. Computer 101, according to instructions stored therein, may provide the configuration file 110, along with one or more templates 115, as input to a code generator module 130.

A tag file 106 may also be used to build config file 110. The tag file 106 may define tags to be used in the config file 110, and may in fact translate between tags used in a business rule 105 and tags used in a template 115, e.g., hypertext markup language (HTML) tags, extensible markup language (XML) tags, etc. Thus, a business rule 105 may specify a certain value or operation to be associated with a tag, and the tag file 106 may be used to determine a template 115 tag with which the business rule 105 is associated.

The template or templates 115 may further be used to generate one or more question files 120. A question file 120 may be provided from computer 101, e.g., via a computer network, to an input device 125, e.g., a general purpose computer. A user of the device 125 may provide input in response to prompts generated according to the questions file 120, such input being used to further populate and/or determine contents of config file 110. Further, it is possible that input device 125 and computer 101 are a single computing device, e.g., that operations ascribed herein to device 125 may actually be performed by the computer 101.

As with instructions for carrying out all operations ascribed herein to computer 101, code generator 130 is generally tangibly stored as a set of computer-executable instructions on a non-transitory computer-readable medium, the instructions being accessible and executable by a computing device, e.g., a general purpose computer such as computer 101. By using information in one or more config files 110 to perform substitutions and/or insertions of information in one or more templates 115, code generator 130 may generate one or more code files 135. Code generator 130 also generally generates a log file 140. In addition, a test module 145 may perform testing and/or validation processes with respect to the one or more code files 135, as discussed further below. The test module 145 may write to the log file 140 or to some other log, as also discussed further below.

An example of business rules 105 is as follows:

---

1. filename:ABC uses templates: template1, template2, template3;
2. filename:DEF uses templates: template1, template2;
3. filename:GHI condition1 templates:template1 condition: <variable>.equals("<variable>") template:template4;

---

For example, the foregoing business rules 105 could be included in a file. The first business rule 105 specifies that a code file 135 called "ABC" should be created using three templates identified respectively as "template1," "template2," and "template3." The second business rule 105 specifies that a code file 135 called "DEF" should be created using two templates identified respectively as "template1," and "template2." The third business rule 105 specifies that, when generating a code file 135 called "GHI," for a tag called "condition1" in a template called "template1," a value associated with a "variable" tag should be given a value equal to the value associated with the "variable" tag in a template called "template 4." The foregoing exemplary business rules 105 all apply to a specific code file 135. However, a business rule 105 could apply to multiple code files 105, or to all code files 135 being generated. For example, in the third business rule 105 shown above, "filename:GHI" could be omitted, indicating that the specified conditional operation is to be applied to all generated code files 135, e.g., all code files 135 generated using a config file 110.

A config file 110 may provide specifications for using, and performing substitutions and/or insertions in, a template 115 as shown in the following example:

--- template:template1 path:path1
template:template2 path:path2
filename:ABC path:path3

---

The first line in the foregoing example specifies that a code file 135 should be generated with a filename indicated by "value1." The second line in the foregoing example specifies that whenever a "variable1" tag appears in a template 115, "variable1" should be replaced by "value2" when generating the code file 135. The third line in the foregoing example specifies that a code file 135 named "ABC" should be created, and stored according to a "path," i.e., at a location in a computer, on a network, etc, specified by the value path3. For example, a path may specify a computer by name or Internet Protocol address, and may further specify a location in a directory tree, where a file 135 should be stored.

In general, as discussed below with respect to FIG. 3, a config file 110 may be initially generated, e.g., with information such as depicted in the foregoing example, and then further written to in a process, such as process 300 shown in FIG. 3, for generating code files 135. Accordingly, a further example of a config file 110 is provided below as part of the discussion of process 300.

In actual operation of the system 100, generally more than one template 115 is used in generation of a code file 135. For example, the first exemplary business rule 105 described above provides for the concatenation of three templates 115, i.e., uses the templates 115 in a sequential fashion, in the generation of a code file 135. However, in addition to sequential use of templates 115, the templates 115 may be nested. Nested templates 115 are not generally described in business rules 105. Instead, a first template 115 may include a reference to a second template 115, which may in turn include a reference to a third template 115, etc. Note that a first template 115 could include references to a plurality of other templates 115, which each in turn could similarly include references to one or more yet other templates 115. An example of nesting templates 115 is discussed below.

A template 115, as mentioned above, may include rules for formatting a web page, e.g., according to HTML, a Java Server Page (JSP) or the like. Further, a template 115 may include one or more sets of code for performing an operation, such as a database operation (query, update, insertion, deletion, etc.), an operation performed depending on whether a condition is satisfied, and that is performed by code implemented in, e.g., Java or JavaScript, etc. In general, templates 115 may include document templates 115, database access templates 115, and procedural templates 115. As mentioned above, a document template 115 may include document format specifications according to HTML or the like. Further, a document template 115 may have nested within it database access templates 115, and/or procedural templates 115.

An example of content of a document template 115 that specifies a format for a document, and mechanisms for populating the document, is as follows:

```
<HTML>
<condition1>
<BODY>
...
<variable1>
</BODY>
</HTML>
```

Tags such as "condition1" and "variable1" may have replacement values specified in a business rule 105, or possibly in another template 115. Further, although the example above relates to HTML format, a template 115 and/or a code file 135 may include multiple formats, e.g., HTML and JSP.

A further example of content in a template 115, this example being of a database access template 115, and including Structured Query Language (SQL) code for performing a database operation, specifically, for inserting data into a database, is as follows:

```
CONNECT TO db USER username USING pwd
SET SCHEMA schm
INSERT INTO <table1> (<column1>) VALUES (<value3>)
COMMIT
CONNECT RESET
```

This example also specifies tags that may have replacement values specified in a config file 110, e.g., "value3" specifies a value or values to be inserted into "column1" of database "table1."

Yet a further example of content in a template 115, this example pertaining to a procedural template 115 that includes instructions for executing a Java function, is as follows:

```
<%
function f1 (String parameters)
{
    if (<condition>) {
        <condition procedure>
    }
    return retval;
}
%>
```

For example, the foregoing example could provide code to be used to replace the "condition1" tag in the first template 115 example above.

Yet a further example of content in a template 115, this example pertaining to a PHP script for retrieving data from a database, is as follows, where the tags variable1, variable2, variable3, and variable4 may have replacement values specified in a config file 110:

```
<?php
$hDB = mysql_connect ('<variable1>', '<variable2>',
'<variable3>');
mysql_select_db('<variable4>', $hDB);
$countsql = "select min (answerid) as answermin,
max (answerid) as answermax from
answers";
$q=mysql_query($countsql);
    while($row=mysql_fetch_assoc($q)) {
        $answermin=intval($row['answermin']);
            $answermax=intval($row['answermax']);
    }
//srand((float) microtime( ) * 10000000);
$pickrow = rand($answermin, $answermax);
$picksql = "select answertext from answers where answerid
= ". $pickrow;
$q2=mysql_query($picksql);
    while($row=mysql_fetch_assoc($q2)) {
        $answertext=$row['answertext'];
    }
```

An example of content from a template 115 using the Perl scripting language is as follows:

```
for $key (keys %seen) {
        $linkcount++;
        $seenkey = $key;
            if ($linkcount > $startindex and $linkcount <
$endindex) {
        print $linkcount . " " . $seenkey. "\n";
        $parser2 = HTML::LinkExtor->new(undef, $seenkey);
        $parser2->parse(get($seenkey))->eof;
        @links2 = $parser2->links;
        foreach $linkarray2 (@links2) {
            local (@element2) = @$linkarray2;
            local ($elt_type2) = shift @element2;
            while (@element2) {
                <rule1>{
    local ($attr_name2, $attr_value2) = splice (@element2, 0,
2);
                $seen2{$attr_value2}++;
        }
```

-continued

```
        }
    }            $linkcount2=0;
```

In the foregoing example, note the "rule1" tag. This tag may specify that a particular business rule 105 should be imported from a config file 110. The rule 105 could specify variety of operations, such as a conditional operation, definition of variables, etc. Further, the rule 105 could identify one or more templates 115 having content to be used in replacing the "rule1" tag, i.e., the "rule1" tag could be a mechanism for nesting templates 115.

An example of content from a template 115 formatted as a Java Server Page (JSP) is as follows:

```
<tr>
    <td width="15%"
        class=fieldlabelsleft>Segment: </td>
    <td><html:select styleId="segment"
        property="segment">
        <c:forEach
        items="${sessionScope.vSegment}"
        var="<variable1>">
            <html:option value="${<variable1>}">
                <c:out value="${<variable1>}" />
            </html:option>
        </c:forEach>
    </html:select></td>
</tr>
```

Note, in this example, that the "variable1" tag is used multiple times; a tag having a replacement value can be used multiple times in a template 115.

A questions file 120 may be generated by parsing a template for templates 115 specified in business rules 105 for which a code file 135 is desired. An exemplary question in a questions file 120 may be as follows:

What should be the value of variable1?:variable1

This example contemplates that a template 115 indicate a required by a business rule 105 includes an indication of a variable value "variable1." The questions file 120 accordingly includes a question to be posed to a user concerning a desired value of "variable 1." Further, the questions file 120 indicates that input received in response to the question is to be stored for use as "variable1." Thus, a value for "variable 1" received from input device 125 may be written to config file 110.

Exemplary output to a log file 140 is as follows:

```
3/25/2010 11:01AM start #1
3/25/2010 11:02AM created file <filename1> with new
filename-part ABC
3/25/2010 11:02AM replaced <variable1> with "value" in
file named <filename1>
3/25/2010 11:02AM created file <filename2> with new
filename-part ABC
3/25/2010 11:03AM replaced <variable1> with "value" in
file named <filename2>
3/25/2010 11:03AM ERROR in <template1> trying to replace
<variable 1> with "value" in file named <filename2>,
stack trace:
{...stack trace...}
3/25/2010 11:02AM created file <filename3> with new
filename-part ABC
3/25/2010 11:04AM replaced <variable1> with "value" in
file named <filename3>
3/25/2010 11:04AM end #1.
```

In general, it is desirable to log events, including but not limited to errors, related to generation of a code file 135. For example, as seen above, when a code file 135 is created, or replace operations are performed with respect to a file, etc., a log 140 entry may be generated.

Figure 2:
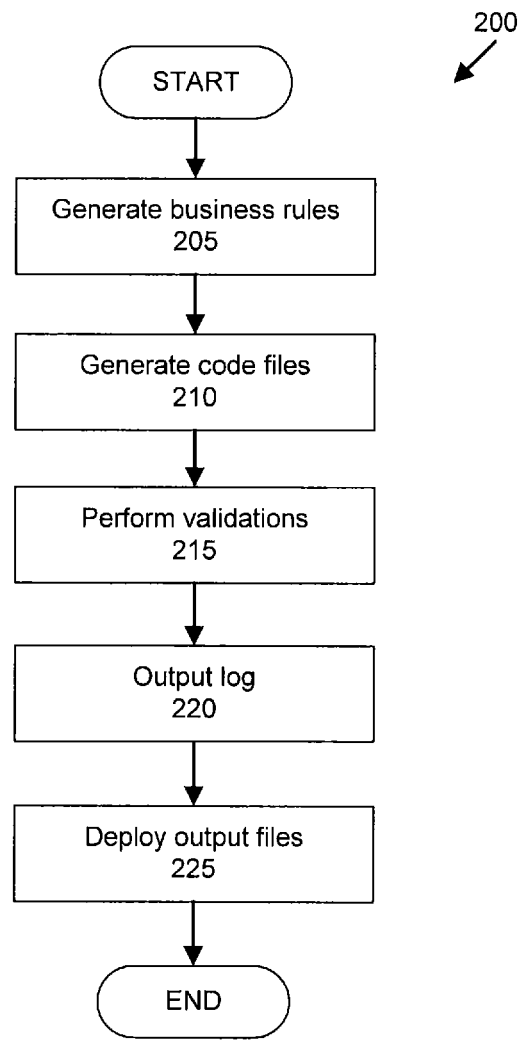
FIG. 2 illustrates an exemplary high-level process for code generation and validation.

FIG. 2 illustrates an exemplary high-level process 200 for code generation and validation.

The process 200 begins in a step 205, in which business rules 105 are generated. For example, a user may create a business requirements document formatted so as to provide business rules 105, and store such document in computer 101. In general, business rules 105 may follow a variety of formats, such as the format illustrated above, so long as the format is consistent with instructions for parsing business rules 105 that are stored in computer 101.

Next, in step 210, code generation module 130 generates one or more code files 135. A process 300 for generating code files 135 is described in more detail below with respect to FIG. 3.

Next, in step 215, computer 101 executes instructions to perform validations with respect to the one or more code files 135. A process 400 for validating code files 135 is described in more detail below with respect to FIG. 5.

Next, in step 220, computer 101 writes results to log file 140 concerning code file 135 generation and validation. Alternatively or additionally, as discussed below, log file 140 may be written to as code files 135 are generated, validated, etc.

Next, in step 225, generated code files 135 that have passed validations are deployed by computer 101. For example, generated code files 135 may be stored in a directory of computer 101 or some other computer that is accessible by a web server or the like.

Following step 225, process 200 ends.

Figure 3:
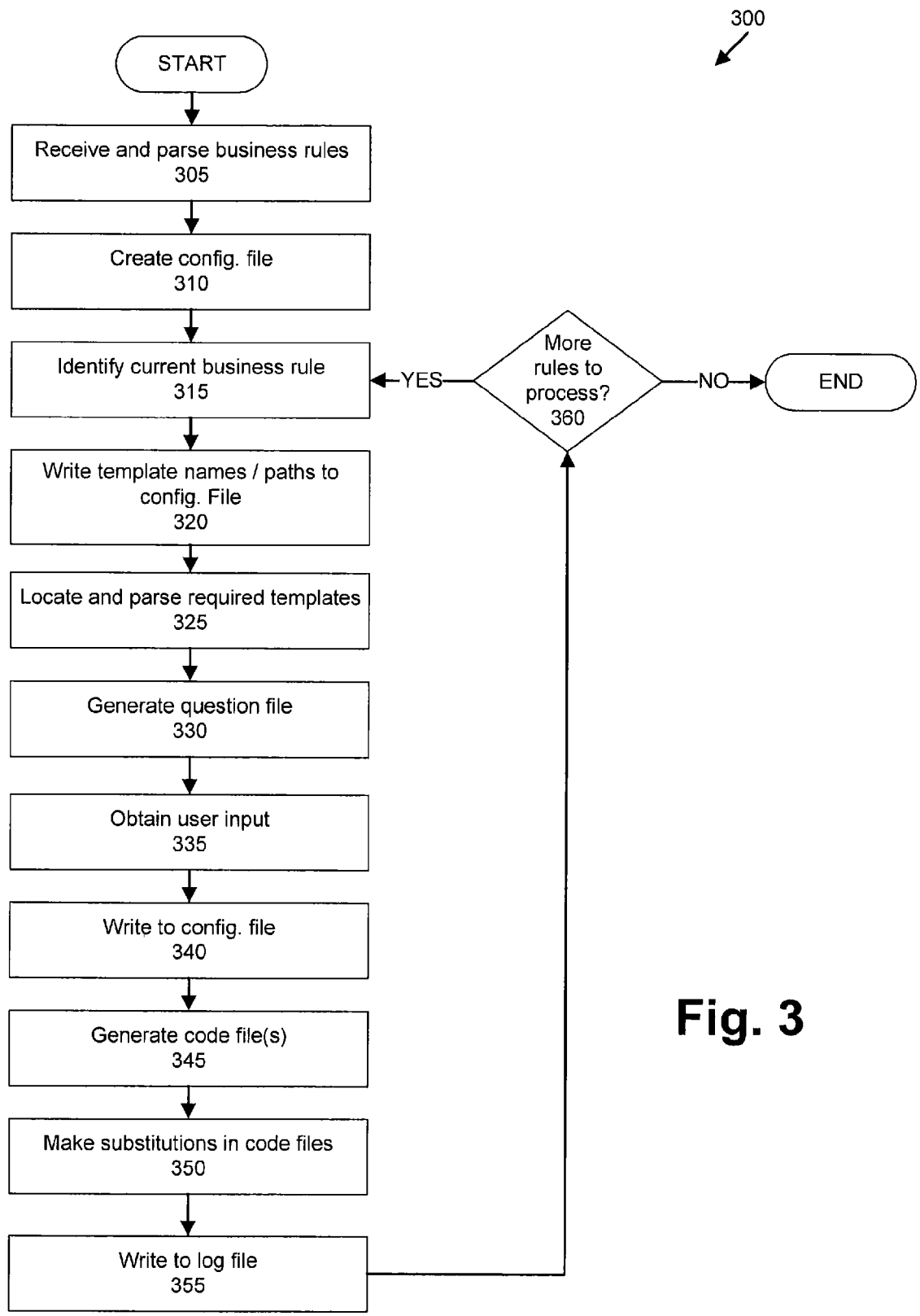
FIG. 3 illustrates an exemplary process for generating code files.

FIG. 3 illustrates an exemplary process 300 for generating code files 135.

The process 300 begins in a step 305, when computer 101 receives and parses business rules 105. For example, a user may store a document including business rules 105 in a storage medium associated with computer 101, and/or computer 101 may receive business rules 105 from some other computing device, e.g., via a computer network. Although not shown in FIG. 3, if computer 101 is unable to parse business rules 105, an error may be generated, and process 300 may end. Alternatively, if computer 101 is able to parse only a portion of business rules 105, a portion of a document purporting to include business rules 105 that cannot be parsed may be ignored. Further, in such event, an administrator or user could be provided with an alert, or some other messaging mechanism could be used, to provide the user or administrator with an option to either proceed with processing despite detected parse errors, or to cease processing.

Next, in step 310, using information parsed from business rules 105, computer 101 creates a config file 110.

Next, in step 315, computer 101 identifies a current business rule 105 to be processed. That is, a document including business rules 105 generally includes one or more business rules 105. A config file 110 therefore generally implements more than one business rule 105, although it is possible for a config file 110 to implement only one business rule 105.

Further, each business rule 105 is generally associated with one or more code files 135 to be generated from one or more templates 115, i.e., as specified by business rules 105. Therefore, next, in step 320, computer 101 generally writes to the config file 110 location information, e.g., names and/or paths, e.g., locations in a directory, uniform resource locators, etc., of the one or more templates 115 specified by the current business rule 105. In addition, if the current business rule 105 specifies a value for any variables that may be included in a template 115, such values are also written to the config file 110.

Next, in step 325, computer 101 locates and parses the one or more templates 115 identified as needed for the current business rule 105. For example, templates 115 could be stored on computer 101 or an associated storage device, or could be stored at a remote network location, etc. A template 115 is parsed in step 325 to identify template 115 variables or other values, such as a condition or threshold to be met for a function to be executed, etc., that require definition for generation of one or more code files 135.

Next, in step 330, computer 101 generates a question file 120 generally by parsing the one or more templates 115 identified as needed for the current business rule 105 to obtain variables needing values when a code file 135 is generated.

Next, in step 335, user input, e.g., via device 125, is obtained in response to questions in question file 120. For example, user input could be obtained by providing questions in a form in a web browser or other graphical user interface, and allowing a user to input responses to question into fields, e.g., text boxes, provided in the form.

Next, in step 340, user input received in step 335 is used to populate config file 110 with values for variables found in templates 115.

An example of content of a config file 110, after having been written to as described above with respect to steps 320 and 340, is as follows:

```
template:template1 path:path1
template:template2 path:path2
filename:ABC path:path3
filename:ABC
user-input-variable5:value1
user-input-variable6:value2
filename:DEF
user-input-variable7:value3
user-input-variable8:value4
filename:ABC
variable1:value5
variable2:value6
variable3:value7
filename:DEF
variable1:value8
variable2:value9
variable3:value10
filename:ABC uses templates:template1,template2,template3
filename:DEF uses templates:template1,template2
filename:DEF rule1 templates:template1
condition:<variable9>.equals("<variable10>")
template:template4
```

In the foregoing example, a "path," as explained above, is a location of a template, e.g., on a computer, at a network locations, etc. As can be seen, two code files 135 are specified to be generated, named respectively "ABC" and "DEF." Further, values for user-input variables are specified, along with values and operations taken from templates 115. The operation "condition:<variable9>.equals('<variable10>')" does not have any filename specified, and therefore applies to both code files 135.

Following step 340, next, in step 345, code generator 130 uses the config file 110 and specified templates 115 to generate one or more code files 135. That is, the config file 110 generally specifies one or more templates 115, along with values for variables in the templates 115. Accordingly, code generator 130 generally creates copies of each specified template 115, named according to a name specified in the config file 110, thus creating output code files 135. Code generator 130 may also create code files 135 based on copies of nested templates 115, i.e., templates 115 referred to in a template 115 explicitly identified as associated with a business rule 105.

Next, in step 350, once all required code files 135 have been generated, then code generator 130 performs a search and replace operation within each code file 135 to replace values of variables in the code file 135 with values specified in the config file 110.

Next, in step 355, code generator 130 writes to log file 140. Generally, log file 140 may be written to in conjunction with performing any of the steps of process 300. Further, it may be desirable to write to log file 140 at each step of process 300, or at multiple steps of process 300, so that log file 140 is as up-to-date as possible in the event of a system crash. Generally each operation, e.g., creation of a file, a search and replace operation, etc., along with detected errors, are reported in log file 140.

Next, in step 360, code generator 130 determines whether the config file 110 includes further business rules 105 to be processed. If yes, then process 300 returns to step 315. Otherwise, process 300 ends following step 360.

Note that, in some implementations, a questions file 120 may be unnecessary, and steps 330 and 335, and any other operations pertaining to a questions file 120, may be omitted. For example, business rules 105 may include all variable values needed for a config file 110. However, even in such case, a questions file 120 could be used to confirm values specified in business rules 105. Where user input in response to a questions file 120 did not match a value specified in a business rule 105, such mis-match could be used to generate an error condition, and stop a process of generating code files 135, or could be used to override the value specified in the business rule 105.

Figure 4:
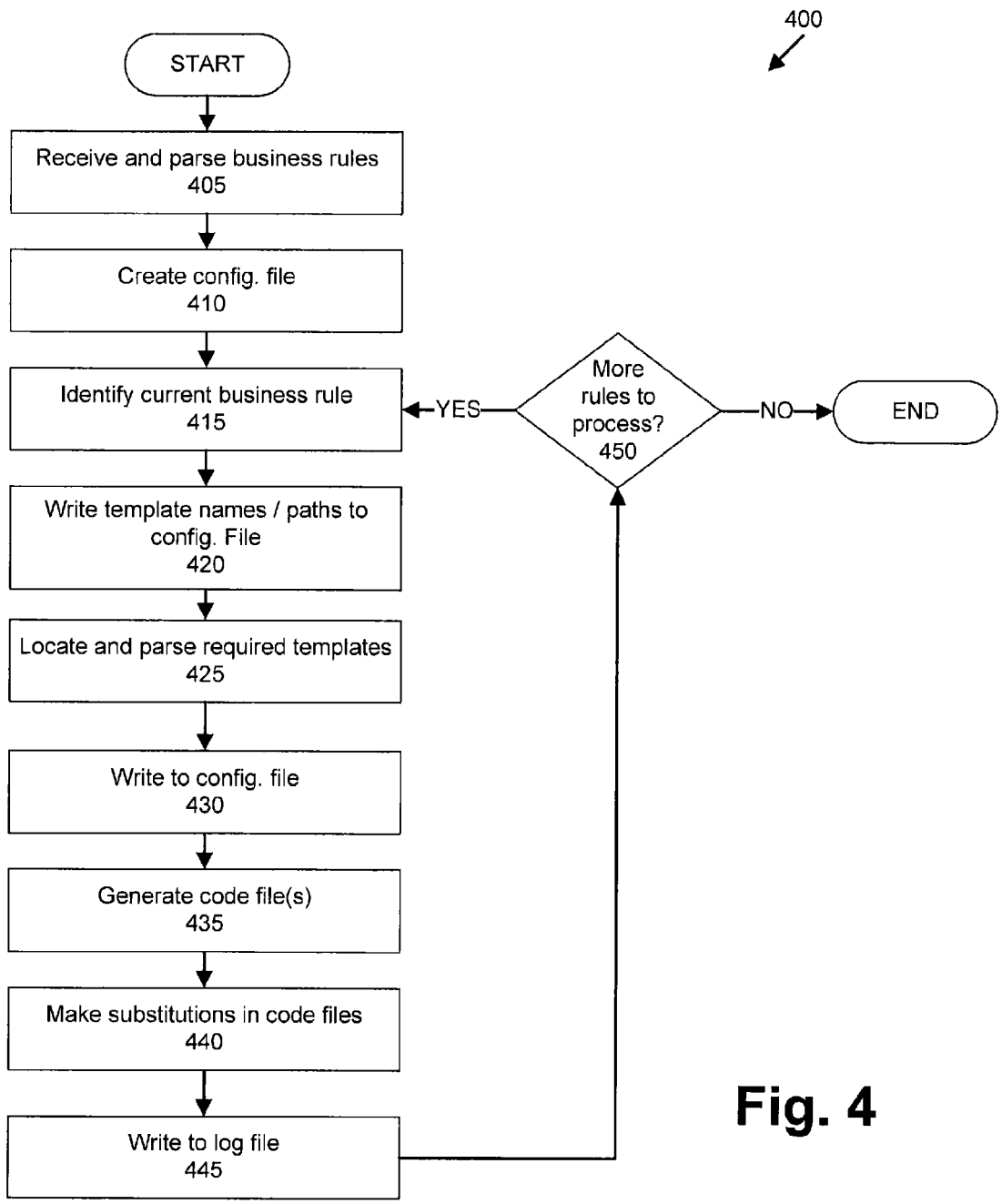
FIG. 4 illustrates an exemplary process for generating code files in which a questions file is omitted.

Accordingly, FIG. 4 illustrates an exemplary process 400 for generating code files 135 in which a questions file 120 is omitted. Steps 405-425 correspond respectively to steps 305-325, discussed above with respect to FIG. 3. Steps 430-450 correspond respectively to steps 330-360, discussed above with respect to FIG. 3.

Figure 5:
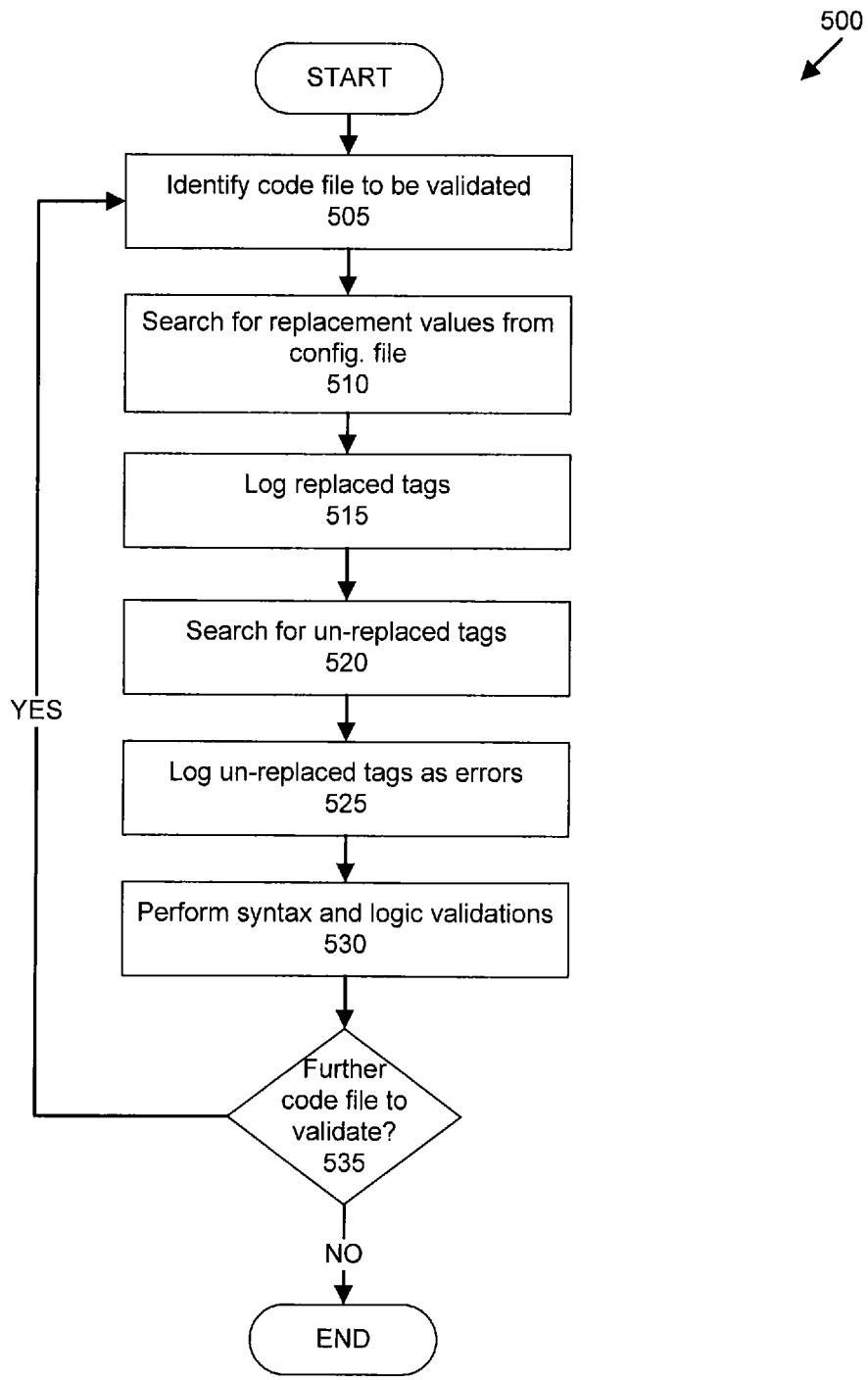
FIG. 5 illustrates an exemplary process for validating and testing generated code files.

FIG. 5 illustrates an exemplary process 500 for validating and testing generated code files.

The process 500 begins in a step 505, in which computer 101, e.g., according to instructions included in testing module 145 or the like, identifies a code file 135 to be validated. Code generator 130 may have generated multiple code files 135 requiring validation, in which case a code file 135 may be selected from a set of code files 135, e.g., according to a timestamp associated with the code file 135 when it was generated, a name of the code file 135, etc. Code files 135 to be validated could be identified according to input from an external source, e.g., according to user input, a trigger from code generator 130 after the code files 135 have been generated, etc.

Next, in step 510, testing module 145, by reading the config file 110 created in step 310 of process 300 as described above, identifies values in code file 135 that were replaced in templates 115 to generate the code file 135. That is, as discussed above, a config file may specify variable values, operations including conditional operations, etc. that are to be used to replace specified tags in templates 115. Accordingly, testing module 145 may identify where such tags were replaced in the code file 135.

Next, in step 515, tags determined to have been replaced in templates 115 to generate the code file 135 are logged, e.g., in log file 140. Entries in log file 140 generally identify a code file 135 in which a tag was replaced, the tag that was replaced, and sometimes further information, such as a line number or the like identifying a location in the code file 135 in which the tag was replaced.

Next, in step 520, testing module 145 searches the code file 135 for any tags that have not been replaced, i.e., tags that match tags in a source template file 115.

Next, in step 525, any un-replaced tags identified in step 520 are identified in an entry written to a log, e.g., log file 140. For example, a particular code file 135, as well as a location in the code file 135, or other information, along with the un-replaced tag may be written to the log.

Next, in step 530, testing module 145 performs syntax and logic validations with respect to each of the one or more code files 135. results of such validation could be written to a log file, e.g., log file 140. For example, testing module 145 may include instructions for parsing a code file 135 according to certain syntax rules. For example, code file 135 could be expected to be a hypertext markup language (HTML) document, a Java server page (JSP), etc.

For a code file 135 that is executed by an interpreter, the interpreter could be used to validate the code file 135. For example, if the interpreter, upon parsing the code file 135, generated a syntax error, testing module 145 could receive the syntax error and write it to a log file such as log file 140.

In addition, or where an interpreter is unavailable or cannot be used because code file 135 includes content that is not interpreted, regular expressions may be used to validate a code file 135. As is known, a regular expression provides a manner for identifying character strings that match patterns, including a specific string of text, in a string of characters. Generally, a programming language" syntax can be described by a set of regular expressions. Thus, a code file 135 purporting to include a valid example of that language can be analyzed according to a regular expression model of that language's valid syntax. If the regular expression analysis generates errors, then testing module 145 may determine that the code file 135 is not valid. Testing module 145 could write such errors to a log file such as log file 140.

Next, in step 535, testing module 145 determines whether one or more further code files 135 remain to be validated. If so, process 500 returns to step 505. Otherwise, process 500 ends following step 535.

Computing devices such as computer 110 may employ any of a number of computer operating systems, including, but by no means limited to, versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines (IBM) of Armonk, N.Y., and the Linux operating system. In one implementation, computer 110 is a mainframe computer sold by IBM, and uses IBM's z/OS operating system. Computing devices in general may include any one of a number of computing devices, including, without limitation, a computer workstation, a desktop, notebook, laptop, or handheld computer, or some other computing device.

Computing devices such as computer 110, IPG server 130, etc., generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above. Database 115 may be any of a variety of known RDBMS packages, including IBMS DB2, or the RDBMS provided by Oracle Corporation of Redwood Shores, Calif.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
receiving, in a computer, at least one business rule that specifies at least one template to be used in generating a code file;
generating a configuration file that identifies a location of the at least one template;
retrieving the at least one template using the identified location;
generating a question file that indicates at least one tag in the at least one template by parsing the at least one template;
obtaining user input concerning a value that relates to the at least one tag; and
generating, in the computer, the code file by replacing the at least one tag in the template with the value; and
at least one of:
a) searching the configuration file to identify at least one tag to be replaced by the value in the at least one template,
identifying at least one tag in the code file that were replaced by the value; and
writing the identified at least one tag to a log file, or
b) comparing at least one variable value, included in the at least one business rule and used to generate the configuration file, with the user input, and
in response to determining via the comparison that the at least one variable value and the user input differ, overriding the at least one variable value with the user input.

2. The method of claim 1, wherein the code file is formatted at least in part as at least one of a hypertext markup language (HTML) page and a java server page (JSP).

3. The method of claim 1, further comprising:
searching the code file to identify at least one tag that was not replaced by the value or by any value;
writing errors to the log file, the errors identifying the at least one tag that was not replaced by the value or by any value.

4. The method of claim 1, further comprising performing a validation of the code file.

5. The method of claim 1, wherein the at least one tag is associated with a conditional operation.

6. The method of claim 1, further comprising generating the configuration file at least in part by using a tag file that translates between a first tag used in the at least one template and a second tag used in the at least one business rule.

7. The method of claim 1, wherein the question file includes at least one question, the user input obtained in response to presenting of the at least one question to a user of the computer.

8. A non-transitory computer-readable medium tangibly embodying computer-executable instructions including instructions for:
receiving at least one business rule that specifies at least one template to be used in generating a code file;
generating a configuration file that identifies a location of the at least one template;
retrieving the at least one template;
generating a question file that indicates at least one tag in the at least one template by parsing the at least one template;
obtaining user input concerning a value that relates to the at least one tag; and
generating the code file by replacing the at least one tag in the template with the value; and
at least one of:
a) searching the configuration file to identify at least one tag to be replaced by the value in the at least one template,
identifying at least one tag in the code file that were replaced by the value; and
write the identified at least one tag to a log file, or
b) comparing at least one variable value, included in the at least one business rule and used to generate the configuration file, with the user input, and in response to determining via the comparison that the at least one variable value and the user input differ, overriding the at least one variable value with the user input.

9. The medium of claim 8, wherein the code file is formatted at least in part as at least one of a hypertext markup language (HTML) page and a java server page (JSP).

10. The medium of claim 8, further including instructions for:
searching the code file to identify at least one tag that was not replaced by the value or by any value;
writing errors to the log file, the errors identifying the at least one tag that was not replaced by the value or by any value.

11. The medium of claim 8, further including instructions for performing a validation of the code file.

12. The medium of claim 8, wherein the at least one tag is associated with a conditional operation.

13. The medium of claim 8, further including instructions for generating the configuration file at least in part by using a tag file that translates between a first tag used in the at least one template and a second tag used in the at least one business rule.

14. A system, comprising:
a computing device configured to:
receive at least one business rule that specifies at least one template to be used in generating a code file;
generate a configuration file that identifies a location of the at least one template;
retrieve the at least one template;
generate a question file that indicates at least one tag in the at least one template by parsing the at least one template;
obtain user input concerning a value that relates to the at least one tag; and
generate the code file by replacing the at least one tag in the template with the value: and
at least one of:
a) search the configuration file to identify at least one tag to be replaced by the value in the at least one template,
identify at least one tag in the code file that were replaced by the value; and
write the identified at least one tag to a log file, or
b) compare at least one variable value, included in the at least one business rule and used to generate the configuration file, with the user input, and
in response to determining via the comparison that the at least one variable value and the user input differ, override the at least one variable value with the user input.

15. The system of claim 14, wherein the code file is formatted at least in part as at least one of a hypertext markup language (HTML) page and a java server page (JSP).

16. The system of claim 14, the computing device further configured to:
   search the code file to identify at least one tag that was not replaced by the value or by any value;
   write errors to the log file, the errors identifying the at least one tag that was not replaced by the value or by any value.

17. The system of claim 14, the computing device further configured to perform a validation of the code file.

18. The system of claim 14, wherein the at least one tag is associated with a conditional operation.

19. The system of claim 14, the computing device further configured to generate the configuration file at least in part by using a tag file that translates between a first tag used in the at least one template and a second tag used in the at least one business rule.

* * * * *